(12) United States Patent
Russinovich et al.

(10) Patent No.: US 8,806,494 B2
(45) Date of Patent: *Aug. 12, 2014

(54) MANAGED CONTROL OF PROCESSES INCLUDING PRIVILEGE ESCALATION

(71) Applicant: Microsoft Corporation, Redmond, WA (US)

(72) Inventors: Mark Russinovich, Austin, TX (US); Bryce Cogswell, Austin, TX (US); Wesley G. Miller, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/934,309

(22) Filed: Jul. 3, 2013

(65) Prior Publication Data

US 2013/0298128 A1 Nov. 7, 2013

Related U.S. Application Data

(63) Continuation of application No. 11/702,427, filed on Feb. 5, 2007, now Pat. No. 8,490,093.

(60) Provisional application No. 60/765,022, filed on Feb. 3, 2006.

(51) Int. Cl.
| | | |
|---|---|---|
| *G06F 9/46* | (2006.01) |
| *G06F 7/04* | (2006.01) |
| *G06F 17/30* | (2006.01) |
| *G06F 15/16* | (2006.01) |
| *G06F 13/00* | (2006.01) |
| *H04L 29/06* | (2006.01) |
| *G06F 9/00* | (2006.01) |
| *G06F 17/00* | (2006.01) |
| *G06F 12/00* | (2006.01) |
| *G06F 12/14* | (2006.01) |
| *G11C 7/00* | (2006.01) |

(52) U.S. Cl.
USPC ............... 718/100; 718/102; 718/104; 726/2; 726/6; 726/16; 726/17; 726/18; 726/21

(58) Field of Classification Search
None
See application file for complete search history.

(56) References Cited

U.S. PATENT DOCUMENTS

| | | | |
|---|---|---|---|
| 6,185,678 B1 | 2/2001 | Arbaugh et al. |
| 6,189,100 B1 | 2/2001 | Barr et al. |
| 6,308,274 B1 | 10/2001 | Swift |
| 6,463,535 B1 | 10/2002 | Drews |
| 6,993,589 B1 | 1/2006 | Blumenau et al. |
| 7,587,755 B2 | 9/2009 | Kramer |
| 7,882,538 B1 | 2/2011 | Palmer |
| 2002/0062453 A1 | 5/2002 | Koga |

(Continued)

OTHER PUBLICATIONS

Provos, et al. "Preventing Privilege Escalation," Technical Report, TR-02-2, CiteSeer, CITY-University of Michigan, 11 pages, Aug. 2002, USA.

*Primary Examiner* — Charles Swift
(74) *Attorney, Agent, or Firm* — Jim Sfekas; Kate Drakos; Micky Minhas (57) ABSTRACT

Determining execution rights for a process. A user selects a process for execution. A driver intercepts the execution and communicates with a service or its remote agent. Configuration data is accessed to determine an execution role specifying whether the process should be denied execution or should execute with particular rights to access or modify system resources. The execution role is provided to the driver, and the driver allows or denies execution of the process in accordance with the provided execution role.

20 Claims, 10 Drawing Sheets

(56) References Cited

U.S. PATENT DOCUMENTS

| | | |
|---|---|---|
| 2002/0099952 A1 | 7/2002 | Lambert et al. |
| 2003/0055987 A1 | 3/2003 | Ji et al. |
| 2003/0069915 A1 | 4/2003 | Clough et al. |
| 2003/0105849 A1 | 6/2003 | Iwamoto et al. |
| 2004/0103324 A1 | 5/2004 | Band |
| 2005/0138421 A1 | 6/2005 | Fedronic et al. |
| 2005/0246762 A1 | 11/2005 | Girouard et al. |
| 2005/0278793 A1 | 12/2005 | Raley et al. |
| 2006/0107039 A1 | 5/2006 | Sugiura et al. |
| 2006/0174319 A1 | 8/2006 | Kraemer et al. |
| 2007/0199057 A1 | 8/2007 | Plummer |
| 2007/0294532 A1 | 12/2007 | Kujirai et al. |
| 2011/0066948 A1 | 3/2011 | Tsao |

MANAGED CONTROL OF PROCESSES INCLUDING PRIVILEGE ESCALATION

CROSS-REFERENCE TO RELATED APPLICATIONS

This application is a continuation of U.S. application Ser. No. 11/702,427, filed Feb. 5, 2007, which claims the benefit of U.S. Provisional Application No. 60/765,022, filed Feb. 3, 2006, the entire disclosures of which are incorporated herein by reference for all purposes.

BACKGROUND

A process spawned by an application program typically executes in the context of a user that launched the application program. That is, the process has access to resources of the operating system corresponding to the access available to the user. Some processes, however, require greater access to system resources than the user context can offer. Hence, these processes often fail after being denied access to the required resources. In these typical systems, another user with greater rights (e.g., administrator rights) has to log in and launch the application program to enable the application to access the required resources.

SUMMARY

Embodiments of the invention enable a process to have elevated or escalated privileges to access system resources according to configuration or privilege data maintained in a memory area. In an embodiment, a driver requests an execution role for a process selected by a user for execution. The configuration data is accessed to determine the requested execution role. The requested execution role is provided to the driver. Execution of the process is either denied or allowed to proceed according to the provided execution role.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Appendix A describes exemplary implementations of embodiments of the invention.

Corresponding reference characters indicate corresponding parts throughout the drawings.

DETAILED DESCRIPTION

In an embodiment, the invention manages execution of processes in a particular context. In particular, the invention manages access by the processes to resources available on a computing device and in an operating system on a process-by-process basis.

Figure 1:
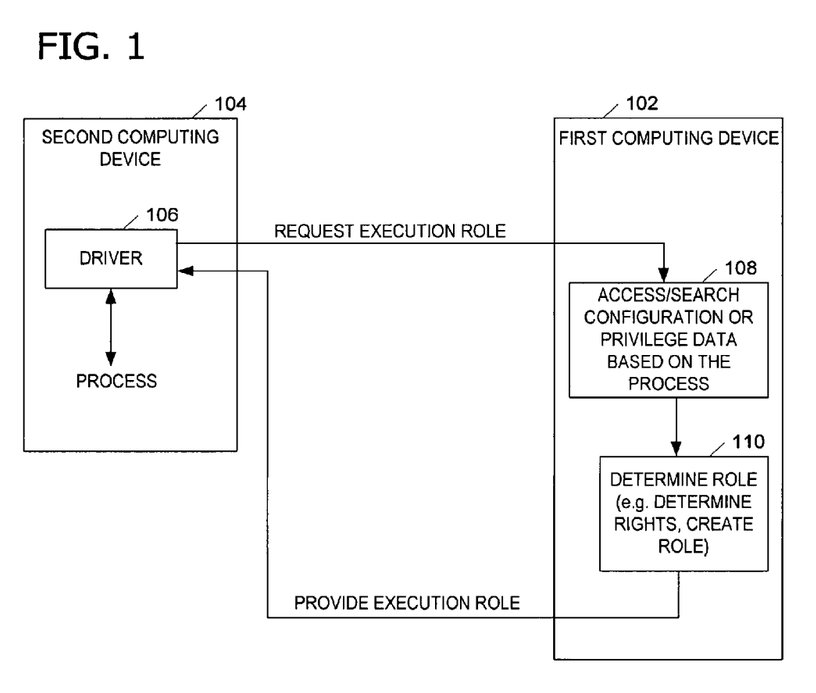
FIG. 1 is an exemplary block diagram illustrating communication between a first computing device and a second computing device for determining an execution role for a process.

Referring first to FIG. 1, an exemplary block diagram illustrates communication between a first computing device 102 and a second computing device 104 for determining an execution role for a process. Execution roles define what processes are allowed or not allowed to run on particular computing devices or by particular users. In addition, execution roles define execution rights associated with a particular process (e.g., execute as the user, or execute as an administrator) in accessing system resources. In general, the execution role defines the execution context of the processes. Typically, a process executes in the context of the user that initiates the process. In FIG. 1, the first computing device 102 such as a server communicates with the second computing device 104 such as a client. The first computing device 102 may also be referred to as a host or host machine.

A driver 106 executes on the second computing device 104 to detect the launch or initialization of a process. The driver 106 intercepts process execution and suspends the execution while determining the execution role associated with the detected process. In particular, the driver 106 communicates with the first computing device 102 to obtain the execution role. The first computing device 102 accesses or searches the configuration or privilege data based on the process at 108 to identify or determine the execution role at 110. For example, the process may be identified by a unique signature, hash, or other identification means. The second computing device 104 determines the execution role and/or the execution rights designated or assigned to the process, and provides the execution role to the driver 106. Upon receiving information regarding the execution role from the first computing device 102, execution of the process proceeds (or ends) accordingly. For example, the execution role may indicate that the process is not authorized to execute on the second computing device 104 in particular, or is not authorized to be executed by the particular user. In another example, the process is authorized to be executed in the user's context, or in an administrator's context. In the latter example, the process is said to have escalated or elevated rights in that the process will execute in the administrator's context even though the process was launched in the user's context.

In operation, the first computing device 102 receives, from the driver 106 executing on the second computing device 104, a request for an execution role of a process selected by a user for execution on the second computing device 104. Alternatively or in addition, the process may be selected by an entity other than the user (e.g., the operating system, another process, an executable file, an executable image, an installation file, etc.). For example, the process relates to installation and use of a hardware device on the second computing device 104.

The first computing device 102 accesses configuration data relating to the user, the second computing device 104, and the process. For example, the configuration data relates to a plurality of processes. The configuration data defines rights for execution of the process. In an example, the configuration data indicates whether each of the processes has an administrative execution role or a user execution role associated therewith. The configuration data may be searched as a function of the process (e.g., a signature of the process), the user (e.g., a user identifier), or the second computing device 104 (e.g., a device identifier). The first computing device 102 determines the rights based on the accessed configuration data for the process, creates an execution role for the process based on the determined rights, and provides the created execution role to the driver 106 executing on the computing device. In general, the driver 106 considers the provided execution role when determining whether to allow the particular process to execute on the second computing device 104. In one example, the driver 106 allows the process to execute according to the provided execution role. Alternatively or in addition, the first computing device 102 conveys the execution rights associated with a determined execution role associated with the particular process. In such an embodiment, the first computing device 102 instructs the driver 106 to not allow the process to execute, to allow execution with user rights, or to allow execution with administrator rights.

In an embodiment, the user has limited access to system resources as defined by the user role. If the determined rights enable greater access to the system resources, the process is provided with the greater access. For example, the process will execute with administrator rights. In an embodiment, one or more computer-readable media have compute-executable instructions for execution by a processor to perform the operations illustrated in FIG. 1.

Figure 2:
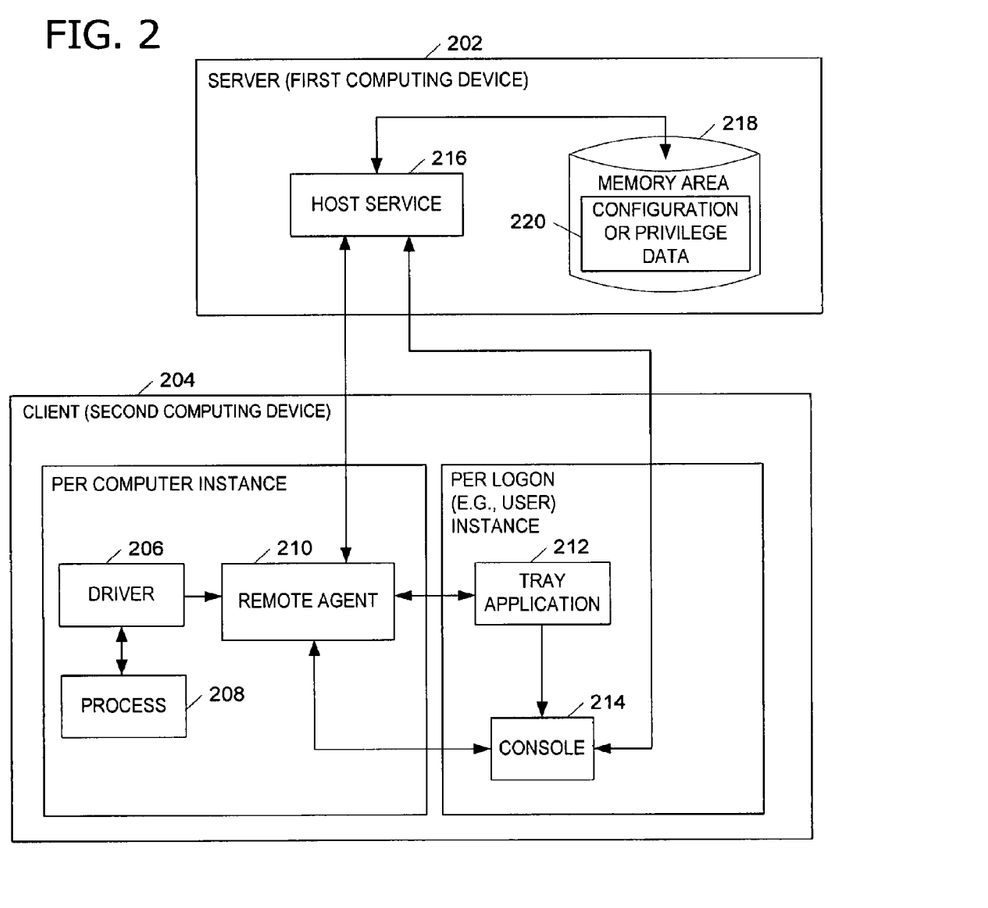
FIG. 2 is an exemplary block diagram illustrating interaction between a client and a server according to an embodiment of the invention.

Referring next to FIG. 2, an exemplary block diagram illustrates interaction between a server 202 and a client 204 according to an embodiment of the invention. In an embodiment, the server 202 is referred to as a first computing device, and the client 204 is referred to as a second computing device. The server 202 includes communications and management infrastructure (e.g., a server service, a data store, and a management interface) which communicate with delegated management consoles (e.g., local data stores and a constrained management interface) such as a console 214 and client systems. The client 204 includes, for example, a client user interface, a client service (which provides communication and process interaction, and a client driver (which provides direct process control). Managed control may extend from directly executable files (*.exe) to other types of executable images (*.dll, *.cpl, *.ocx) as well as standard installation files to control both the installation and use of hardware devices (by class, device type, etc) as matches the role membership of the user or computer being managed.

For each computing device, there is a driver 206 such as described with reference to FIG. 1 and a remote agent 210. The remote agent 210 is a service that communicates with the driver 206 and a host service 216 on the server 202. The remote agent 210 receives requests from the driver 206 to determine the execution role of an application or process 208 (e.g., with administrator rights or with user rights). In an embodiment, applications executing with administrator rights have greater access to system resources, and are thus capable of altering core functionality of the system. As such, only selected applications are authorized to execute with administrator rights.

For each logon instance (e.g., per user), there is a tray application 212 and the console 214. The tray application 212 communicates with the remote agent 210 and with the console 214. The tray application 212 includes, for example, an application that display messages to the user. For example, the tray application 212 displays a tip (e.g., in a balloon) to the user if the logged-on user is a delegator of a role where there is a task requested for the delegator. The console 214 includes, for example, a user interface application for managing computers, file groups, roles, and delegator tasks. File groups include a list of files in a group accessible according to an access control list.

The server 202 includes or has access to the host service 216 and a memory area 218. The host service 216 includes, for example, a communication service to which client machines connect to request services from the server 202. In FIG. 2, the host service 216 has access to the configuration data 220, configuration information, privilege information, or other execution role information stored in the memory area 218. The configuration data 220 relates to a plurality of processes for execution on the second computing device. The configuration data 220 defines access by each of the plurality of processes to resources associated with the second computing device. For example, the configuration data 220 includes an execution role for each of the plurality of processes.

The remote agent 210 may communicate with the host service 216 to determine the execution role for the identified application or process 208, or access a local copy of the configuration data 220 to determine the execution role. In the latter embodiment (not shown), the remote agent 210 downloads the configuration data 220 from the host service 216 as needed (e.g., when the configuration data 220 stored by the host service 216 gets updated). In such an embodiment, the remote agent 210 has direct access to a local copy of the contents of the memory area 218 stored on the server 202. In this manner, requests for the execution role of the process 208 do not require communication with the host service 216, but rather only with the remote agent 210. Reducing communication with the host service 216 improves the speed of request processing, and also enables aspects of the invention to operate in a non-networked environment. If the remote agent 210 is unable to find the execution role in the local configuration data 220, the remote agent 210 may communicate with the host service 216 to locate the information.

In operation, upon receipt of a request from the driver 206 for the execution role of a particular application, the remote agent 210 analyzes the configuration data 220 (e.g., by communicating with the host service 216) to determine if the particular application should be allowed to execute (e.g., with user rights), denied, or executed with administrator privileges. Once an action is determined, the remote agent 210 sends the result to the driver 206. The received execution role is applied to the process 208 or application, and the process 208 or application executes (or is denied) accordingly. If the process 208 is denied the execution rights desired by the user, the user may request via the remote agent 210 that the execution role of a particular application be escalated (e.g., run with administrator rights).

Figure 3A:
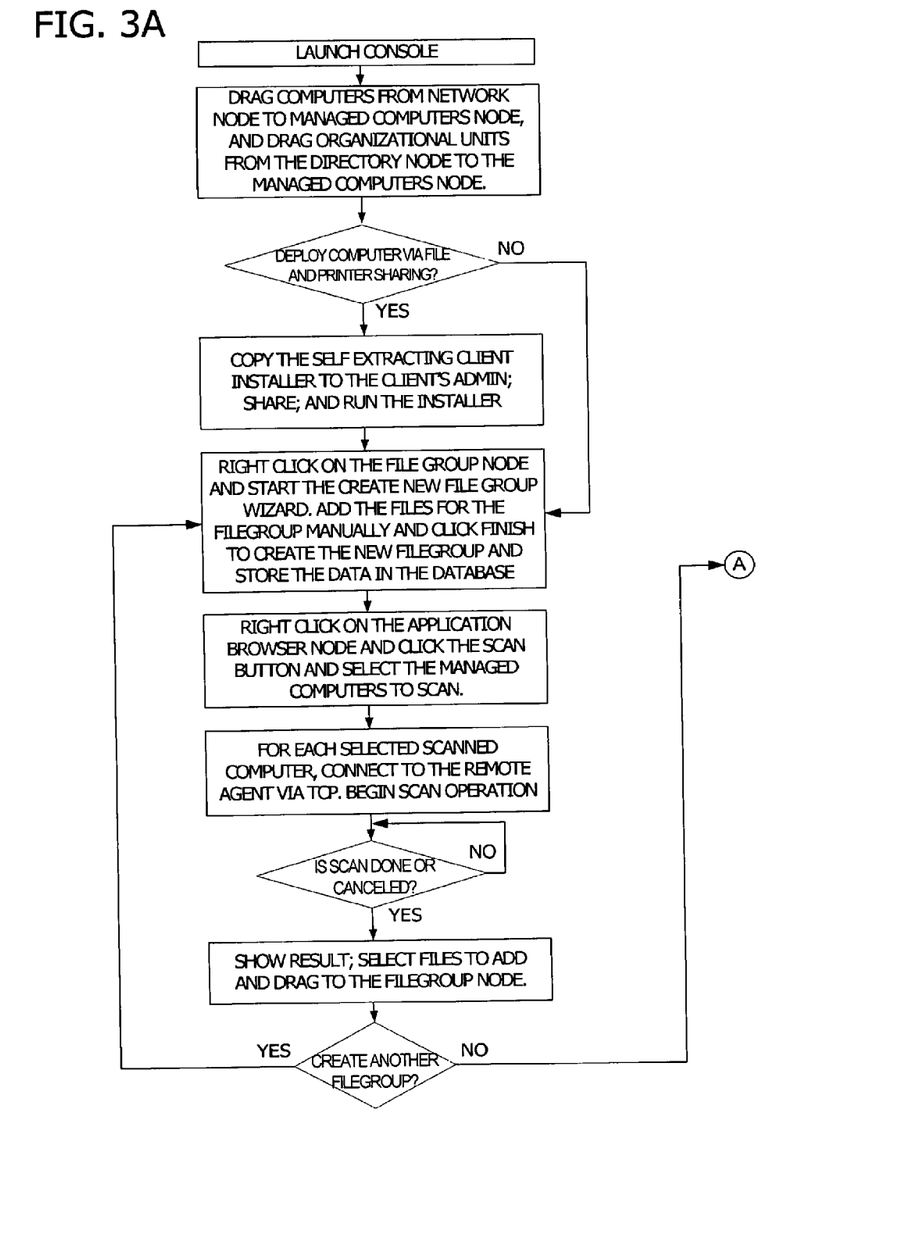
FIGS. 3A and 3B are exemplary flow charts illustrating creation of a new execution role by a domain administrator on a host computing device.
Figure 3B:
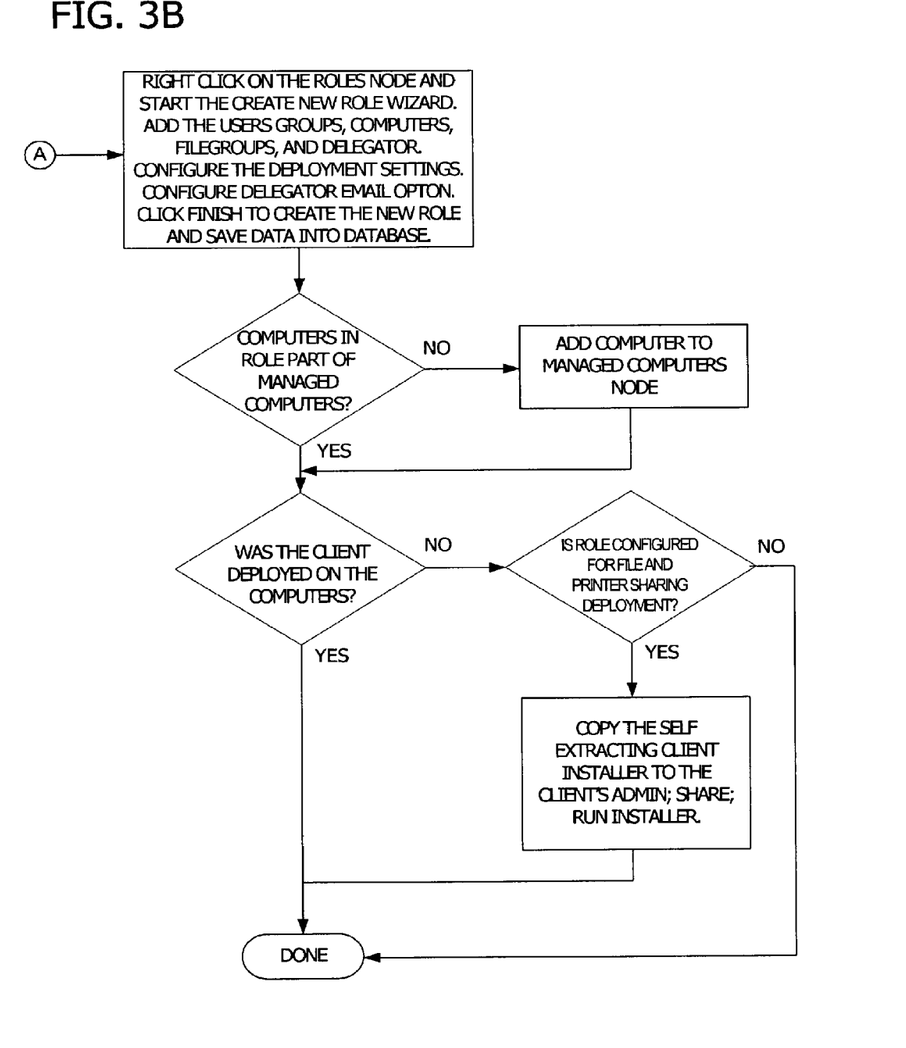

Referring next to FIGS. 3A and 3B, exemplary flow charts illustrate creation of a new execution role by a domain administrator on a host computing device. These figures illustrate the exemplary options involved in configuring an execution role. For example, files, file groups, users, computers, and other items are selected for association with a particular execution role.

Figure 4A:
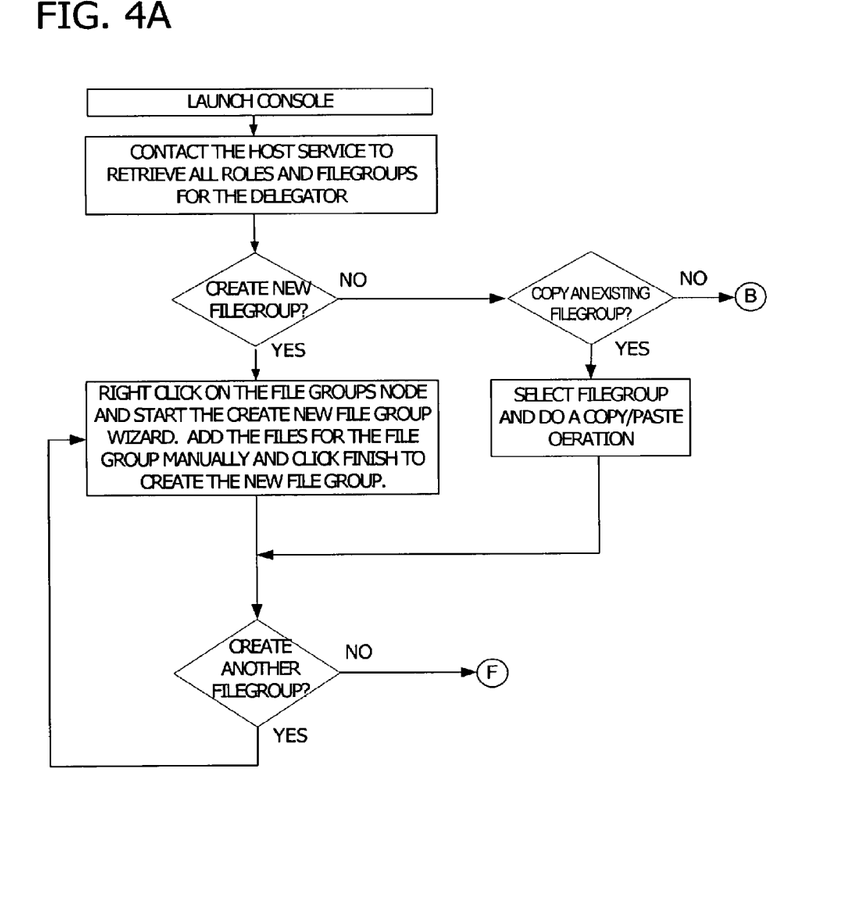
FIGS. 4A and 4B are exemplary flow charts illustrating creation and modification of an execution role by a delegator on a client computing device.
Figure 4B:
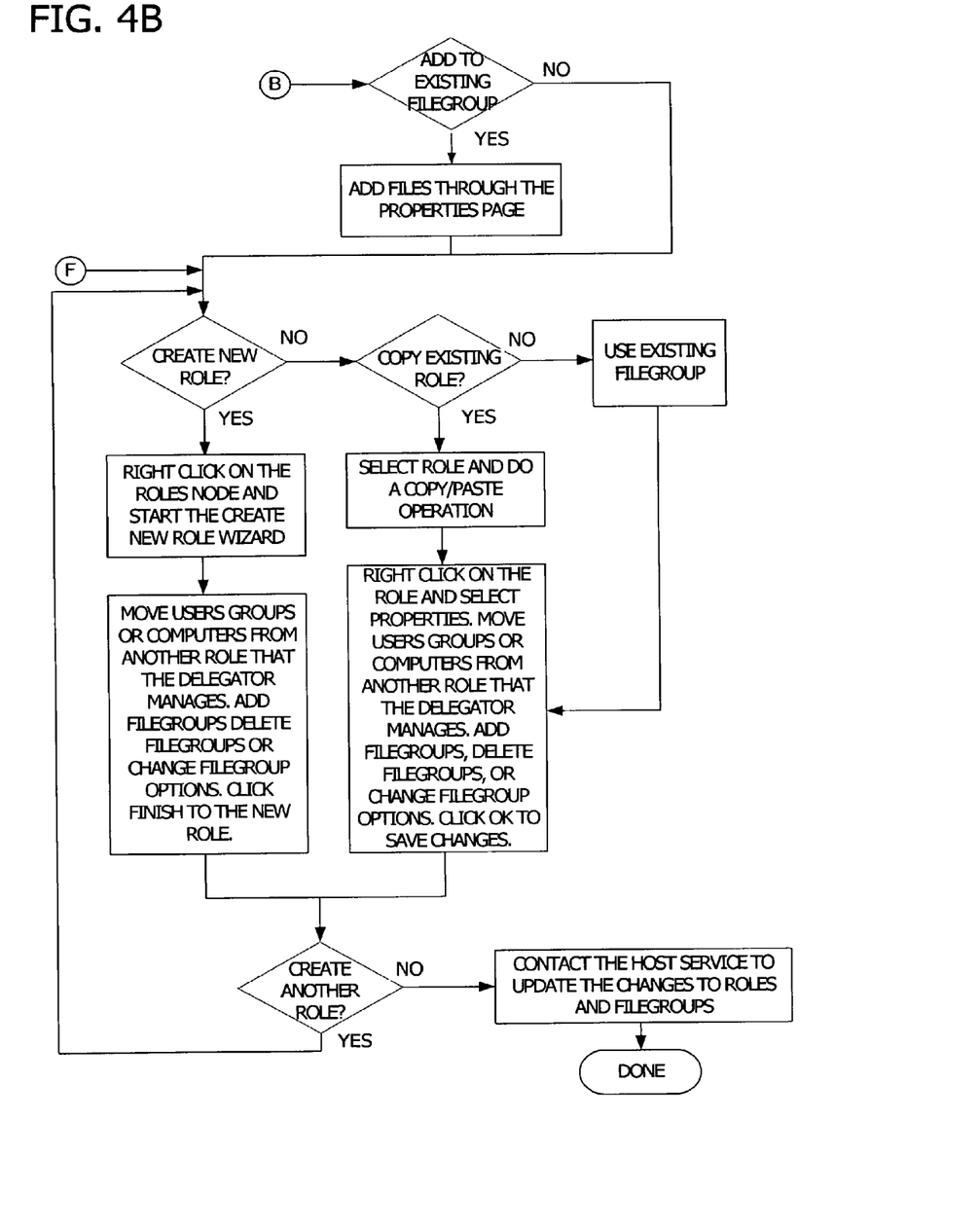

Referring next to FIGS. 4A and 4B, exemplary flow charts illustrate creation and modification of an execution role by a delegator on a client computing device. For example, a file group may be modified by adding or removing files.

In an embodiment, a domain administrator or a delegator creates and modifies roles. A delegator is a user to which the administrator has assigned authority for managing a particular role. The delegator may receive notifications of user requests for application rights and may process the requests on the client machine. In creating new roles, the administrator selects users, groups, file groups, and/or computing devices for association with the new role. In an embodiment, a user, group, and computing device are associated with only one role. For each file group added to the role, the administrator selects one of the following options: Allow, Deny, and Run with Admin Rights. The Allow option specifies that all applications in the file group are allowed to execute normally (e.g., as the user role). The Deny option specifies that all applications in the file group are not allowed to execute. In an embodiment, a denial message explaining the reason for denial is displayed to the user. The Run with Admin Rights option specifies that all applications in the file group are allowed to run and are executed with administrator rights.

The administrator also sets precedence options for the role. For example, the administrator determines whether the user, computer, or local administrator group takes precedence. An access control list (ACL) is associated with each role and each item associated with the role (e.g., user, group, file group, computer, etc.).

Figure 5A:
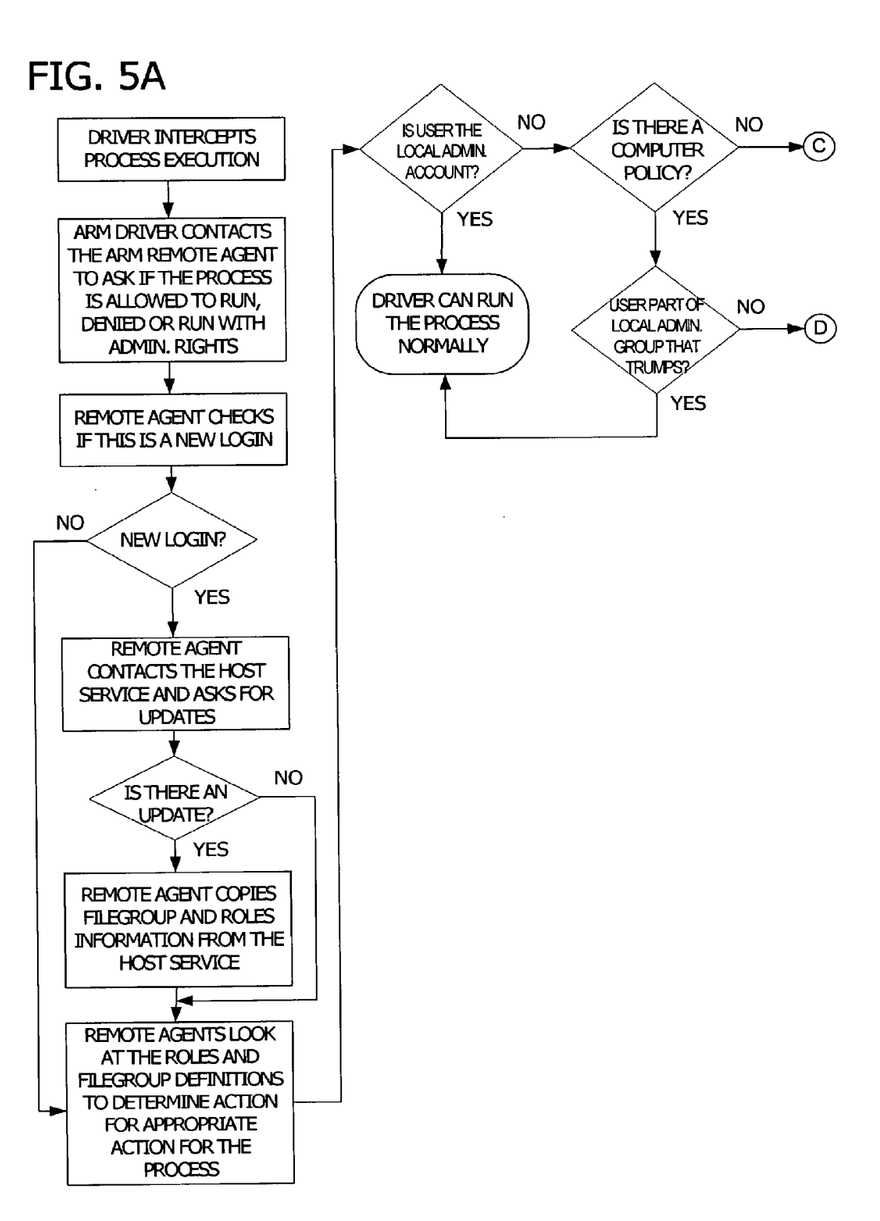
FIGS. 5A and 5B are exemplary flow charts illustrating the determination of an execution role for a process to be executed on a computing device.
Figure 5B:
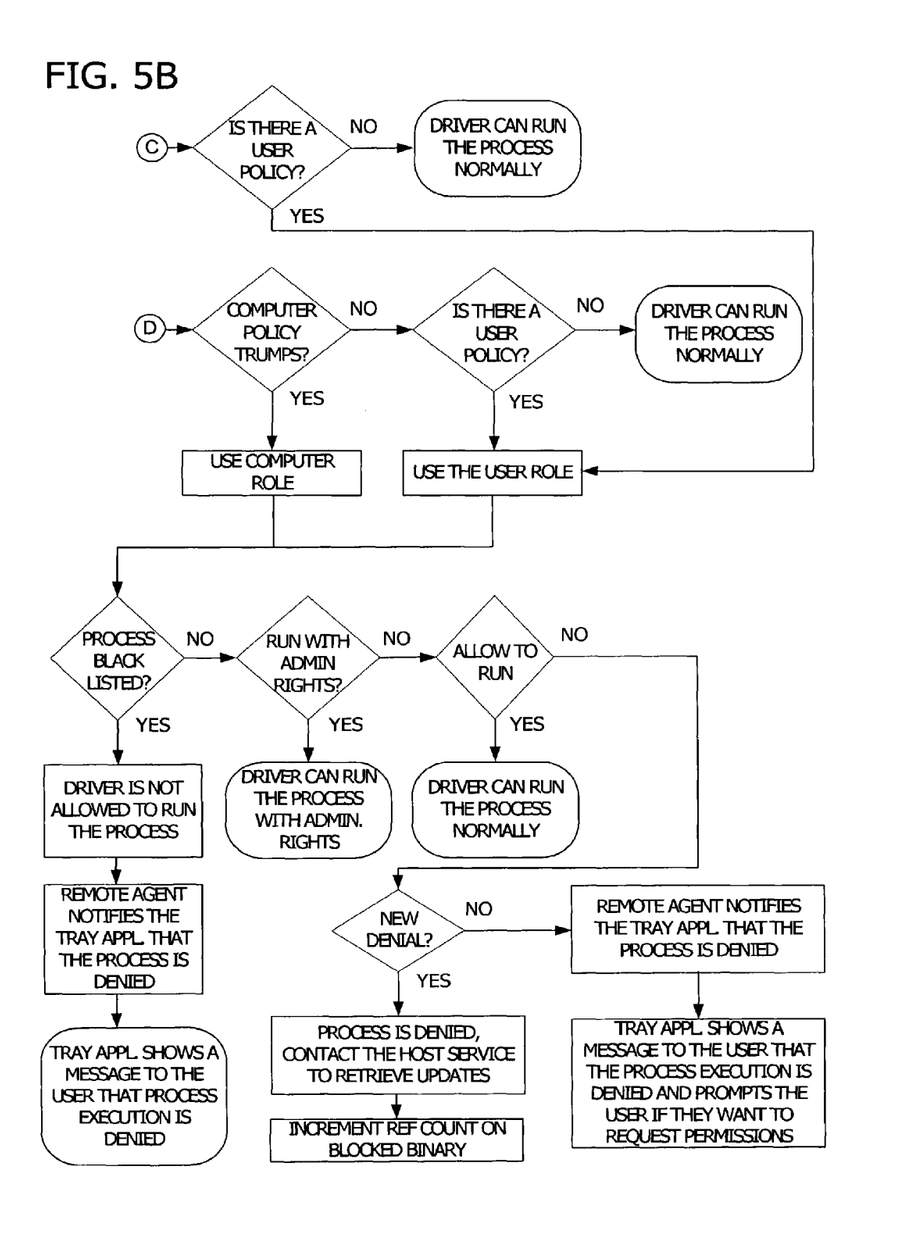

Referring next to FIGS. 5A and 5B, exemplary flow charts illustrate the determination of an execution role for a process to be executed on a computing device. In this example, configuration data is examined to determine the execution role for use in executing the process.

In another example, the following operations occur:
1. The driver intercepts process creation (application launch) and blocks the application, causing it to go into a wait state.
2. The driver queries the service to determine the process' status.
3. The service queries a copy of the data store, which includes information on the interactive user, the current computer, and organizational and group membership of both.
4. Based upon this, the service may proceed to step 5 or 6 accordingly
5. If the application does not match any in the data store, the service queries for an updated copy.
6. If the process (application) matches, or matches after an update, the service determines what to do with it and informs the driver accordingly, as both may have work to do.
   A. If the process lookup results in a process being denied:
      (1) The service notifies the driver
      (2) The process is terminated by the driver
      (3) The process fails to launch normally
   B. If the process lookup results in a process being allowed:
      (1) The service notifies the driver
      (2) The process is released by the driver
      (3) The process launches normally.
   C. If the process lookup results in a process being elevated to have administrative rights:
      (1) The service modifies an operating system token and privileges held by the process to reflect those which would be held by a local Administrator on the system (a member of the Administrators group)
      (2) The service notifies the driver
      (3) The process is released by the driver
      (4) The process launches normally, with elevated privileges
   D. If the process lookup results in a process being constrained to have limited user rights:
      (1) The service modifies an operating system token and privileges held by the process to reflect those which would be held by a local User on the system (a member of the Users group and removes any highly-privileged tokens)
      (2) The service notifies the driver
      (3) The process is released by the driver
      (4) The process launches normally, with elevated privileges If the process lookup results in a process which is not found, one of the following may happen.
1. In a fully enforced role mode:
   The service notifies the driver
   The process is terminated by the driver
   The process fails to launch normally
   The client user interface offers the user the opportunity to send a request for use of the application.
   This request can be handled from a central or remote console in relative real-time
   Approval of the application results in future success when launching the process as above
   Denial results in future inability to launch the process as above
   No action (dismissing) results in the ability to send future requests for the process again.
   The client user interface informs the user of the decision made by the administrator or delegator
2. In a silent deployment mode:
   The service notifies the driver
   The process is released by the driver
   The process launches normally.
   The process execution is silently logged to the data store, allowing an administrator to resolve this in future execution attempts by allowing or denying the application (allowing may also then include privilege elevation or reduction)
3. In an interactive deployment mode
   The service notifies the driver
   The process is released by the driver
   The process launches normally.
   The client user interface offers the user the opportunity to send a request for use of the application in the future, allowing an administrator to resolve this in future execution attempts by allowing or denying the application (allowing may also then include privilege elevation or reduction)
   The client user interface informs the user of the decision made by the administrator or delegator The implementation described above is merely exemplary. Aspects of the invention are not limited to the particular operations or sequence of operations described above or elsewhere herein.

Figure 6A:
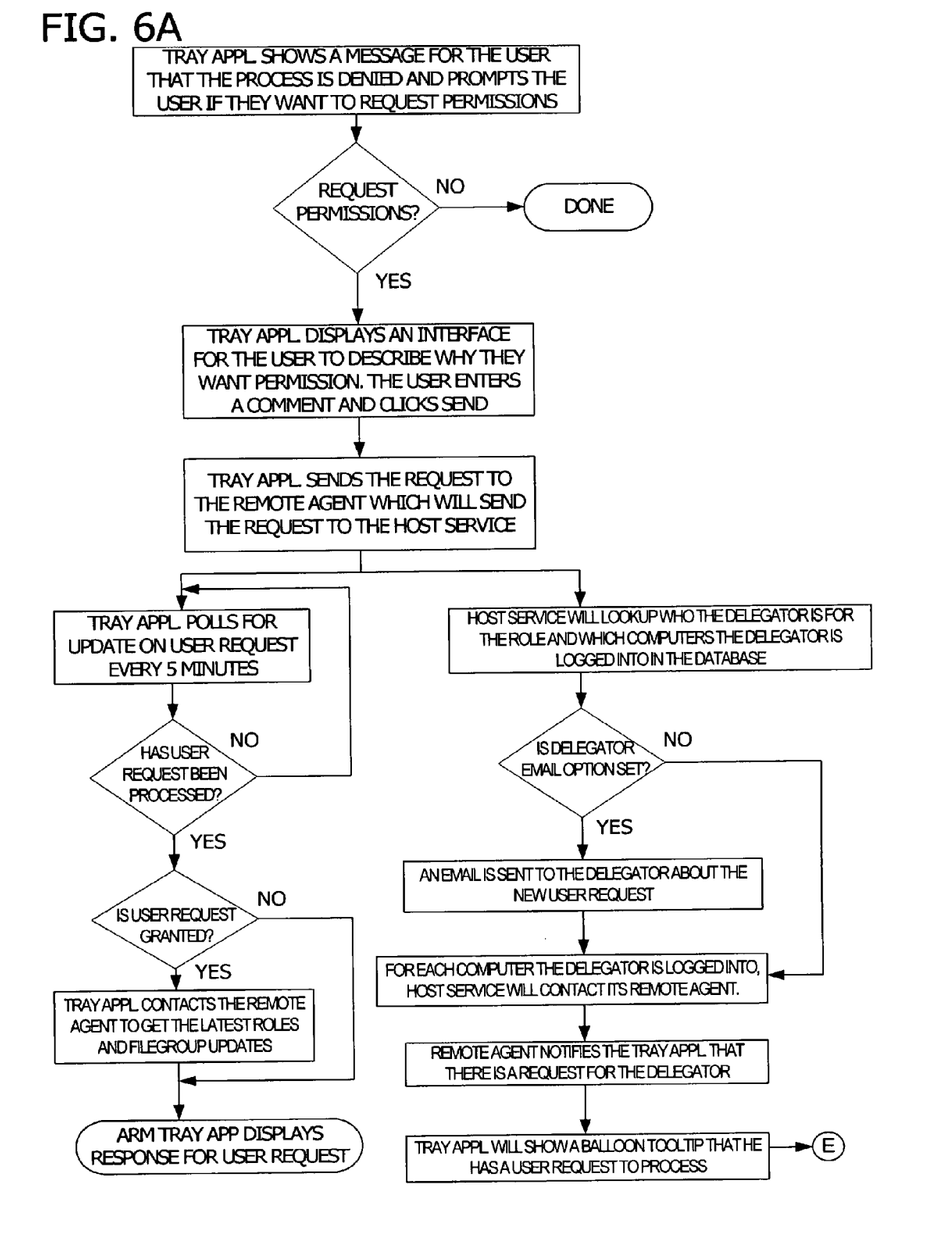
FIGS. 6A and 6B are exemplary flow charts illustrating the processing of a user request for permissions to execute a process.
Figure 6B:
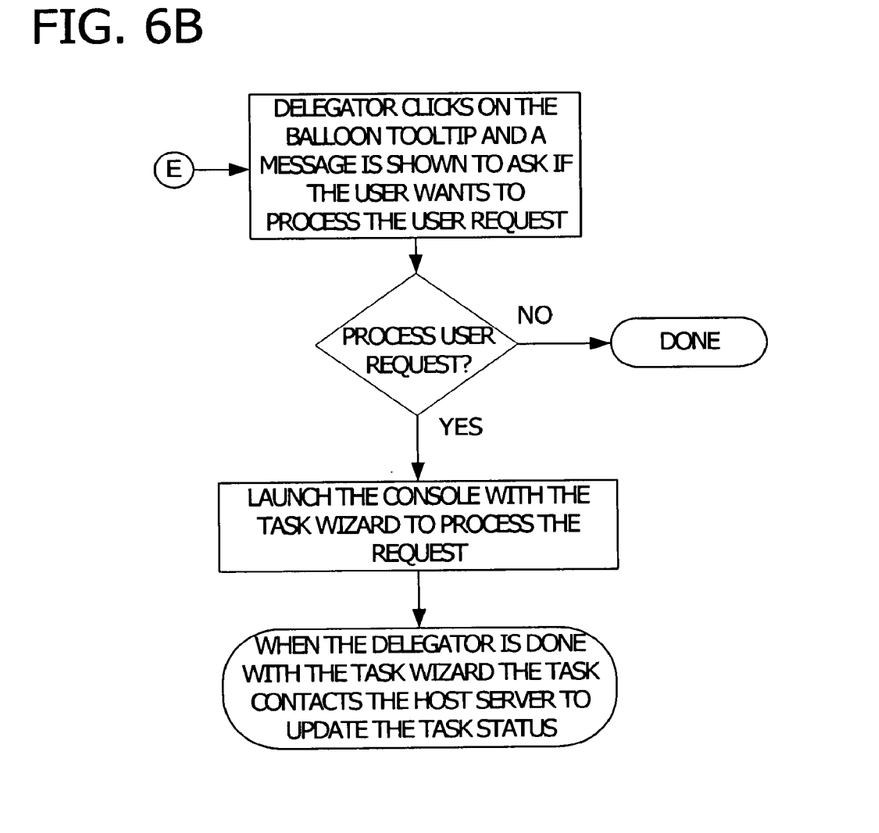

Referring next to FIGS. 6A and 6B, exemplary flow charts illustrate the processing of a user request for permissions to execute a process. In this example, process execution has been denied, as specified in the configuration information. The user is able to request permission to execute the process. FIGS. 6A and 6B detail an exemplary flow for handling such requests.

Alternative embodiments of the invention are next described. Aspects of the invention support compound attribute identification of executables to define a signature or class. In particular, this process uses a combination of two or more unique attributes to define a set of executable content. This classification may be inclusive or exclusive—the key attribute here is that the content will be more constrained based on the results of this "compound" classification. Two examples include (1) Digitally signed files from a specific vendor which are also from a specific URL or UNC which are also internally named; and (2) Digitally signed files from a specific vendor which are also stored under the system's Program Files directory. In this example, there are two or more attributes which can be used for classification by the solution which is controlling/monitoring executable applications. Exemplary attributes include Path\name, NTFS File Owner, Digital Signature, Hash, and Source URL\UNC as downloaded\executed from.

Further aspects of the invention support the trust of executable content as defined by Universal Resource Locator (URL) or other standard location moniker. In particular, this process intercepts downloads as they occur from a web browser and performs the download for the browser if the executable content is acceptable (e.g., it meets a trust classification). This content is downloaded and stored on the system. The attributes (the source URL\UNC) is stored as well. This is in a datastore external to the file (e.g., in an NTFS Alternate File Stream) along with a signature set by the software which performed the download. This path then becomes a secondary trust signature for the executable and determines whether it can be executed or not, and/or with elevated or reduced privileges.

Additional aspects of the invention support the trust of executable content as defined by an internal name compiled into the content. This includes the process of defining a classification of executable content based on an "internal name" as compiled into the executable. This is a safe method of classification in the case that the content is either secured by location (meaning that is another classification attribute) or by digital signature (which becomes invalid if the content is modified) or hash (which becomes invalid if the content is modified). This is convenient to allow for the trust of a broader classification of content (an entire signer, for example) where certain executable content may want to be blocked.

Other aspects of the invention support automatic trust of executable content as defined in a previously trusted application executable installer/installation utility/location. In a system for automated installation of applications, trust and/or elevation allows for reduction of privilege or blocking of untrusted content while allowing trusted installers to function—even in the case of a User on the local system. This process further automatically classifies code as trusted based upon the trust of the installer itself. If a trusted installer runs, any executable content which it places on the system should be then marked as trusted or trusted with elevated\reduced privileges. This allows users to install trusted executable content without creating additional work for the administrator.

Further aspects of the invention support the automated creation of definitions of executable content based on properties or attributes. This process uses classification of certain attributes of incoming application requests to determine whether the executable content should be trusted or not, and with what privileges. Specifically, watching for internal attributes of the file (signer, internal name, version, etc) and allowing for intelligent grouping of executable content for the administrator up to and potentially including actual automated trust of the content.

Additional aspects of the invention support disconnected mobile self-approval of executable content. This process provides administrators the option to enable a restricted type of self-approval. When a disconnected user tries to run an untrusted application, the user is given the option of contacting his or her administrator for an identifying code that will allow that particular application to run. In an embodiment, the identifying code is a one-time use code that will enable the target application to run for some Admin-specified period of time. The period of time is part of the identifying code. The same identifying code would not work for another application, but the administrator is able to approve multiple applications using a series of identifying codes. The client agent checks for the server each time the self approved application is run. If the server is contacted, then rules get updated and the previously self-approved application goes back to untrusted. The identifying code is based on some shared secret established and refreshed when agents contact the server. The identifying code is easy to read over the telephone (everything should be pronounceable and grouped).

Other aspects of the invention support protection from executable content by shielding the system from common attack vectors. This process allows the user to potentially execute untrusted content, while using background processes to determine if the content should be allowed to actually write to the file system or registry, or connect to the network. If the application is not trusted, it is not allowed to connect to the network, but is still allowed to run. Similarly, it allows for the registry or file system writes to occur, but transacts them privately. At such time that the administrator can approve the application (for a mobile user, when returning to the office, for example) the application writes can be transacted to the registry or file system as committed.

Additional aspects of the invention support persistent storage of file archival sets (e.g., referred to as recovery points). This concept includes marking a standard set of files saved as a Recovery Point (a backup or archive) which is demarcated as "persistent" such that while Recovery Points which occurred before or after it in time may have been pruned (deleted) from the file store, but the files from the Recovery Points marked as persistent, and all metadata relating to them, will be carried forward until such point that they cease being marked as persistent.

Further aspects of the invention support intelligent user needs identification. Data backup, disaster recovery, and document control solutions are all fundamentally dependent on the ability of the user of the software (e.g. a system or network administrator) to define the data sources to be captured. Default data sources are often provided, but they are static, and lack the ability to adapt to users' needs. When more complex data sources are necessary, the user must provide information about the data source, such as its location. Due to the importance of the user's ability to be accurate and complete in selecting data sources, aspects of the invention ensure that all critical user data is captured regardless of the user's ability to be accurate and complete. Aspects of the invention provide a mechanism that can intelligently identify important data sources that a user may not be aware of or may not properly define.

Other aspects of the invention support in-depth real-time analysis of process activity. Both on a local or a remote system, the administrator can view: all filesystem input/output (I/O), all registry I/O; all interprocess communication; and the entire thread stack created by a process at any given time, such that all process communication can be traced back to find the origin of an event or issue.

Exemplary Operating Environment

A computing device or computer such as described herein has one or more processors or processing units and a system memory. The computer typically has at least some form of computer readable media Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media The system memory includes computer storage media in the form of removable and/or non-removable, volatile and/or nonvolatile memory. The computer may operate in a networked environment using logical connections to one or more remote computers, such as a remote computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

In operation, computer executes computer-executable instructions such as those illustrated in the figures to implement aspects of the invention.

The exemplary embodiments described and illustrated in Appendix A further illustrate aspects of the invention. The embodiments illustrated and described herein (including those in Appendix A) constitute exemplary means for managing execution of a process on the second computing device, exemplary means for elevating an execution privilege of a process to be executed on the second computing device, and exemplary means for constraining a process to execute on the second computing device with limited rights to access resources of the second computing device.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computer storage memory having computer-executable instructions stored thereon that when executed cause a computing device to perform a method comprising:
    receiving a request for an execution role of a process selected by a user for execution on the computing device, said process having limited access to system resources;
    accessing configuration data relating to the process, said accessed configuration data defining rights for execution of the process;
    determining the rights for the process based on the accessed configuration data;
    accessing privilege data stored in a memory area to retrieve the execution role associated with the process based on the determined rights;
    receiving a request from the user for modification of the execution role for the process; and
    modifying the execution role based on the determined rights to enable the process a different level of access to the system resources.

2. The computer storage memory of claim 1, wherein the process is selected indirectly by the user as a result of executing another process.

3. The computer storage memory of claim 1, wherein the execution role comprises one or more of the following: deny, allow, run as limited user, run with user privileges, run as administrative user, and run with administrative privileges.

4. The computer storage memory of claim 1, wherein creating the execution role comprises modifying a token.

5. A method comprising:
receiving a request for an execution role associated with one of a plurality of processes, said one of the plurality of processes being selected by a user for execution on a computing device, said one of the plurality of processes having limited access to system resources;
accessing configuration data relating to the process, said accessed configuration data defining rights for execution of the process;
determining, based on the configuration data, the rights for execution of the selected process;
retrieving, based on the determined rights, the requested execution role for the selected process;
receiving a request for modification of the execution role for the selected process; and
modifying the execution role based on the determined rights to enable the selected process a different level of access to the system resources.

6. The method of claim 5, wherein the retrieved execution role for the selected process comprises either an administrative execution role or a user execution role.

7. The method of claim 6, wherein the administrative execution role corresponds to greater access to system resources relative to the user execution role.

8. The method of claim 5, further comprising storing a local copy of the configuration data relating to the plurality of processes, said configuration data indicating an execution role associated with each of said processes.

9. The method of claim 8, wherein storing the configuration data comprises storing the configuration data for each of the plurality of processes as a function of the user.

10. The method of claim 8, wherein storing the configuration data comprises storing the configuration data for each of the plurality of processes as a function of the computing device.

11. The method of claim 8, wherein accessing the configuration data comprises performing a process lookup for the selected executing process in the stored configuration data, said performing comprising, when the performed process lookup does not yield the selected process, receiving and searching an updated copy of the configuration data.

12. A system comprising:
a memory area for storing privilege data relating to a plurality of processes for execution, said privilege data defining access by each of the plurality of processes to resources, said privilege data including an execution role for each of the plurality of processes;
a processor configured to execute computer-executable instructions for:
receiving a request for the execution role of a particular process to be executed, said particular process being selected by a user for execution, said particular process being one of the plurality of processes and having limited access to system resources;
accessing configuration data relating to the particular process, said accessed configuration data defining rights for execution of the particular process;
determining the rights for the particular process based on the accessed configuration data;
accessing the privilege data stored in the memory area to retrieve the execution role associated with the particular process based on the determined rights;
receiving a request from a user for modification of the execution role for the particular process; and
modifying the execution role based on the determined rights to enable the particular process a different level of access to the system resources.

13. The system of claim 12, further comprising means for elevating or lowering an execution privilege of a process to be executed.

14. The system of claim 12, further comprising a first computing device and a second computing device, said first computing device including the memory area and the processor and said second computing device executing the process.

15. The system of claim 14, further comprising means for constraining a process to execute on the second computing device with limited rights to access resources of the second computing device.

16. The system of claim 14, wherein the first computing device comprises a server-side communications and management infrastructure.

17. The system of claim 14, wherein the second computing device comprises one or more of the following: a delegated management console and a client computing device.

18. The system of claim 12, wherein the plurality of processes spawn from one or more of the following: an executable file, an executable image, and an installation file.

19. The system of claim 12, wherein at least one of the plurality of processes relates to installation and use of a hardware device.

20. The method of claim 12, wherein the user is an administrator, wherein the determined rights for the process indicate limited access to the system resources, and wherein the execution role is applied to the process to constrain the process to execute with the limited access to the system resources.

* * * * *